United States Patent
Dain et al.

(10) Patent No.: US 10,437,799 B2
(45) Date of Patent: *Oct. 8, 2019

(54) DATA MIGRATION USING A MIGRATION DATA PLACEMENT TOOL BETWEEN STORAGE SYSTEMS BASED ON DATA ACCESS

(71) Applicant: INTERNATIONAL BUSINESS MACHINES CORPORATION, Armonk, NY (US)

(72) Inventors: Joseph W. Dain, Vail, AZ (US); Wayne A. Sawdon, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

This patent is subject to a terminal disclaimer.

(21) Appl. No.: 15/367,295

(22) Filed: Dec. 2, 2016

(65) Prior Publication Data
US 2018/0157654 A1 Jun. 7, 2018

(51) Int. Cl.
*G06F 16/21* (2019.01)
*G06F 16/11* (2019.01)
*G06F 17/24* (2006.01)
*H04L 29/08* (2006.01)

(52) U.S. Cl.
CPC .......... *G06F 16/214* (2019.01); *G06F 16/119* (2019.01); *G06F 17/248* (2013.01); *H04L 67/1097* (2013.01)

(58) Field of Classification Search
CPC ............ G06F 17/303; G06F 17/30079; G06F 17/248; G06F 16/214; G06F 16/119; H04L 67/1097

USPC .......................................................... 707/609
See application file for complete search history.

(56) References Cited

U.S. PATENT DOCUMENTS

| | | | | |
|---|---|---|---|---|
| 6,032,224 A * | 2/2000 | Blumenau | ............... | G06F 12/08 710/15 |
| 6,324,620 B1 * | 11/2001 | Christenson | ............ | G06F 3/061 710/74 |
| 6,779,078 B2 * | 8/2004 | Murotani | ............... | G06F 3/0605 711/112 |

(Continued)

FOREIGN PATENT DOCUMENTS

| WO | WO-03014910 A1 * | 2/2003 | .......... G06F 3/0613 |
|---|---|---|---|
| WO | 2011083040 A1 | 7/2011 | |

OTHER PUBLICATIONS

Lv et al., "HAT: An Efficient Buffer Management Method for Flash-based Hybrid Storage Systems", Frontiers of Computer Science, Jun. 2014, vol. 8, Issue 3, pp. 440-455. (Year: 2014).*

(Continued)

*Primary Examiner* — Phuong Thao Cao
(74) *Attorney, Agent, or Firm* — Griffiths & Seaton PLLC

(57) ABSTRACT

Embodiments for using a migration data placement tool between storage systems based on data access by a processor. Events from a plurality of heterogeneous storage systems may be indexed into a common repository. A migration data placement tool uses analytics to determine data placement of the data in a target storage system according to the data identified as hot data, warm data, or cold data based on the events indexed in the common repository. The data may be placed according to a migration template during migration to the target storage system.

17 Claims, 7 Drawing Sheets

(56) References Cited

U.S. PATENT DOCUMENTS

| | | | | |
|---|---|---|---|---|
| 7,240,122 B2* | 7/2007 | Sato | G06F 17/30079 |
| | | | 707/E17.01 |
| 7,581,061 B2* | 8/2009 | Miyagaki | G06F 3/0613 |
| | | | 711/114 |
| 7,676,396 B1* | 3/2010 | White | G06Q 20/0453 |
| | | | 235/379 |
| 8,041,672 B2* | 10/2011 | Ogawa | G06F 17/30144 |
| | | | 707/609 |
| 8,238,667 B2* | 8/2012 | Hosaka | G11B 27/034 |
| | | | 382/217 |
| 8,315,973 B1* | 11/2012 | Kaiser | G06F 3/0617 |
| | | | 707/609 |
| 8,352,429 B1* | 1/2013 | Mamidi | G06F 16/2282 |
| | | | 707/640 |
| 8,433,674 B2* | 4/2013 | Takata | G06F 3/0605 |
| | | | 707/609 |
| 8,572,311 B1* | 10/2013 | Shalvi | G06F 11/14 |
| | | | 711/103 |
| 8,694,990 B2* | 4/2014 | Dow | G06F 9/5077 |
| | | | 718/1 |
| 8,719,534 B1* | 5/2014 | Ray, III | G06F 3/067 |
| | | | 711/154 |
| 9,514,174 B2* | 12/2016 | Levandoski | G06F 17/30339 |
| 9,626,391 B2* | 4/2017 | Smith | G06F 17/303 |
| 9,864,642 B2* | 1/2018 | Gupta | G06F 9/5016 |
| 9,875,043 B1* | 1/2018 | Suldhal | G06F 3/0619 |
| 10,108,644 B1* | 10/2018 | Wigmore | G06F 17/303 |
| 10,152,239 B1* | 12/2018 | Tamilmani | G06F 3/067 |
| 2005/0125456 A1* | 6/2005 | Hara | G06F 17/30079 |
| 2006/0004957 A1* | 1/2006 | Hand, III | G06F 12/0866 |
| | | | 711/113 |
| 2006/0069862 A1* | 3/2006 | Kano | G06F 3/0605 |
| | | | 711/114 |
| 2006/0129769 A1* | 6/2006 | Chen | G06F 3/0607 |
| | | | 711/162 |
| 2006/0236056 A1* | 10/2006 | Nagata | G06F 3/061 |
| | | | 711/165 |
| 2007/0043787 A1* | 2/2007 | Cannon | G06F 17/3023 |
| 2007/0055715 A1* | 3/2007 | Achiwa | G06F 17/30079 |
| 2007/0061515 A1* | 3/2007 | Kano | G06F 3/0605 |
| | | | 711/114 |
| 2008/0005475 A1* | 1/2008 | Lubbers | G06F 3/0613 |
| | | | 711/118 |
| 2008/0082748 A1* | 4/2008 | Liu | G06F 3/067 |
| | | | 711/114 |
| 2008/0307178 A1 | 12/2008 | Agombar et al. | |
| 2009/0063752 A1* | 3/2009 | Dow | G06F 12/08 |
| | | | 711/6 |
| 2009/0063795 A1* | 3/2009 | Yueh | G06F 3/0608 |
| | | | 711/162 |
| 2009/0064136 A1* | 3/2009 | Dow | G06F 9/4856 |
| | | | 718/1 |
| 2010/0121828 A1* | 5/2010 | Wang | G06F 17/30233 |
| | | | 707/694 |
| 2010/0274766 A1* | 10/2010 | Nagashima | G06F 3/0625 |
| | | | 707/654 |
| 2010/0299547 A1* | 11/2010 | Saika | G06F 1/3203 |
| | | | 713/324 |
| 2011/0134248 A1* | 6/2011 | Heit | G06Q 20/04 |
| | | | 348/161 |
| 2011/0213814 A1* | 9/2011 | Fukatani | G06F 17/30221 |
| | | | 707/827 |
| 2011/0219048 A1* | 9/2011 | Cross | G06F 16/00 |
| | | | 707/821 |
| 2012/0101995 A1* | 4/2012 | Agetsuma | G06F 3/0605 |
| | | | 707/644 |
| 2012/0166749 A1* | 6/2012 | Eleftheriou | G06F 3/0616 |
| | | | 711/165 |
| 2012/0185426 A1* | 7/2012 | Mori | G06F 3/061 |
| | | | 707/609 |
| 2012/0209893 A1* | 8/2012 | Kim | G06F 17/30129 |
| | | | 707/822 |
| 2012/0296883 A1* | 11/2012 | Ganesh | G06F 17/30315 |
| | | | 707/693 |
| 2013/0159359 A1* | 6/2013 | Kumar | G06F 3/0605 |
| | | | 707/822 |
| 2013/0166569 A1* | 6/2013 | Navas | G06F 17/30516 |
| | | | 707/747 |
| 2013/0191591 A1* | 7/2013 | Kim | G06F 3/0625 |
| | | | 711/114 |
| 2013/0227689 A1* | 8/2013 | Pietrowicz | G01R 1/20 |
| | | | 726/23 |
| 2013/0232312 A1* | 9/2013 | Kong | G06F 3/0605 |
| | | | 711/162 |
| 2013/0275802 A1* | 10/2013 | Endo | G06F 11/1076 |
| | | | 714/6.23 |
| 2013/0290598 A1* | 10/2013 | Fiske | G06F 3/0625 |
| | | | 711/103 |
| 2013/0311740 A1* | 11/2013 | Watanabe | G06F 3/061 |
| | | | 711/165 |
| 2013/0325802 A1 | 12/2013 | Bavishi et al. | |
| 2014/0089257 A1* | 3/2014 | Ignacio | G06F 17/303 |
| | | | 707/609 |
| 2014/0172782 A1* | 6/2014 | Schuenzel | G06Q 50/22 |
| | | | 707/609 |
| 2014/0270153 A1* | 9/2014 | Scarpino | H04L 9/0637 |
| | | | 380/28 |
| 2015/0032693 A1* | 1/2015 | Soga | G06F 17/30011 |
| | | | 707/624 |
| 2015/0160885 A1* | 6/2015 | Hara | H04L 61/10 |
| | | | 710/74 |
| 2015/0186051 A1* | 7/2015 | Gurajada | G06F 3/0611 |
| | | | 711/113 |
| 2015/0201016 A1* | 7/2015 | Golander | H04L 67/1097 |
| | | | 709/212 |
| 2015/0256423 A1* | 9/2015 | Stearns | H04L 43/045 |
| | | | 709/224 |
| 2015/0286413 A1* | 10/2015 | Olson | G06F 3/0685 |
| | | | 711/103 |
| 2015/0301743 A1* | 10/2015 | Nagao | G06F 11/34 |
| | | | 711/113 |
| 2015/0324447 A1* | 11/2015 | Kim | G06F 17/30598 |
| | | | 707/737 |
| 2015/0356078 A1* | 12/2015 | Kishimoto | G06F 17/30079 |
| | | | 707/610 |
| 2015/0356125 A1* | 12/2015 | Golander | G06F 17/30309 |
| | | | 707/620 |
| 2016/0011971 A1* | 1/2016 | Lee | G06F 12/0246 |
| | | | 711/103 |
| 2016/0092119 A1* | 3/2016 | Butterworth | G06F 16/119 |
| | | | 711/165 |
| 2016/0224570 A1* | 8/2016 | Sharp | G06F 17/30073 |
| 2016/0328169 A1* | 11/2016 | Hassan | G06F 3/0625 |
| 2016/0357439 A1* | 12/2016 | Uehara | G06F 3/0604 |
| 2016/0378813 A1* | 12/2016 | Yoon | G06F 17/30442 |
| | | | 707/609 |
| 2017/0024137 A1* | 1/2017 | Kanno | G06F 3/0604 |
| 2017/0161508 A1* | 6/2017 | Yoshida | G06F 17/30312 |
| 2017/0168929 A1* | 6/2017 | Kanno | G06F 3/0616 |
| 2017/0220259 A1* | 8/2017 | Choi | G06F 3/0605 |
| 2017/0228409 A1* | 8/2017 | Darcy | G06F 17/30091 |
| 2017/0242625 A1* | 8/2017 | Pandurangan | G06F 3/0659 |
| 2017/0277443 A1* | 9/2017 | Deguchi | G06F 3/0611 |
| 2018/0046411 A1* | 2/2018 | Coburn | G06F 3/0619 |
| 2018/0107598 A1* | 4/2018 | Prodromou | G06F 3/067 |

OTHER PUBLICATIONS

Qing et al., "A Method of Pre-sentence Text Based on Map/Reduce Storage and Indexing Classification", 2014 IEEE 5th International Conference on Software Engineering and Service Science, Jun. 27-29, 2014, Beijing, China, pp. 195-199. (Year: 2014).*

Lu et al., "Aqueduct: Online Data Migration with Performance Guarantees", Conference on File and Storage Technologies (FAST'02), pp. 219-230, Jan. 28-30, 2002, Monterey, CA. (USENIX, Berkeley, CA.) (Year: 2002).*

(56) References Cited

OTHER PUBLICATIONS

Bond H. A., "Data Placement and Migration Strategies for Virtualised Data Storage Systems", Jun. 23, 2009, pp. 1-63, accessed at (Year: 2009).*

Xie et al., "Tiered-CRUSH: A High-Performance Data Placement for Multi-Tiered Storage System", NSF CAC Semi-Annual Meeting, Oct. 1-2, 2015, 1 page. (Year: 2015).*

List of IBM Patents or Patent Applications Treated as Related dated Dec. 5, 2016 (2 pages).

Anonymous, "Define virtual storage pool attributes based on storage volumes to be migrated," An IP.com Prior Art Database Technical Disclosure, IP.com No. IPCOM000234650D, Jan. 24, 2014 (7 pages).

Anonymous, "Method and System for Utilizing Free Space of Distributed Devices as a Backup Pool for a centralized Backup System," An IP.com Prior Art Database Technical Disclosure, IP.com No. IPCOM000237632D, Jun. 27, 2014 (7 pages).

\* cited by examiner

DATA MIGRATION USING A MIGRATION DATA PLACEMENT TOOL BETWEEN STORAGE SYSTEMS BASED ON DATA ACCESS

BACKGROUND OF THE INVENTION

Field of the Invention

The present invention relates in general to computing systems, and more particularly to, various embodiments for intelligent data migration using a migration data placement tool between storage systems based on data access using a computing processor.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. The amount of information to be processed nowadays increases greatly. Therefore, processing and storing very large amounts of information is a key problem to solve.

SUMMARY OF THE INVENTION

Various embodiments for using a migration data placement tool between storage systems based on data access by a processor are provided. Data may be indexed by a migration data placement tool by receiving events from a plurality of heterogeneous storage systems. The migration data placement tool may use analytics to determine data placement of the data in a target storage system according to the data identified as hot data, warm data, or cold data. The data may be placed according to a migration template during migration to the target storage system. Upon migrating data to the target storage system, one or more events may be received from the target storage system to enable an index to be updated with a new location of migrated data (e.g., files).

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
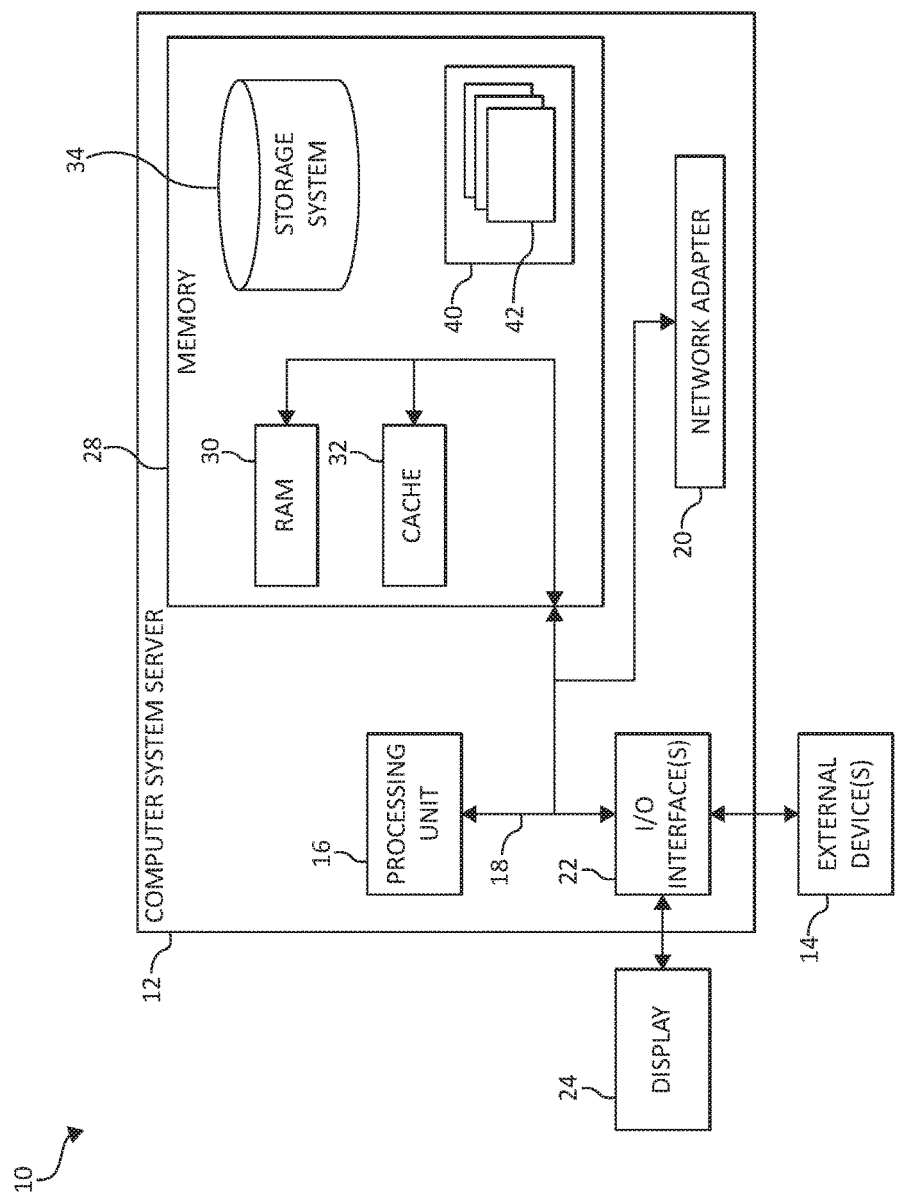
FIG. 1 is a block diagram depicting an exemplary cloud computing node according to an embodiment of the present invention.

Within a computing storage architecture, data may have predictable access patterns. For example, the "hotness" or "coldness" of data may be continually monitored so that it can be optimally placed or accessed on storage media. For example, "hot" (i.e., frequently accessed for read or write access) data may be placed on faster, more expensive storage media (e.g., solid state drives) to improve I/O performance. "Cold" (i.e., less frequently accessed or data that is written once but almost never read during a period of time) data may be placed on slower, less expensive storage media (e.g., hard disk drives) with reduced I/O performance. As the temperature of the data changes, the data may be migrated between storage tiers to optimize I/O performance.

More specifically, a data center may comprise 5% hot data, 30-45% "warm" data (e.g., data that has moderate read or write access or data that is less frequently accessed than hot data but more frequently accessed than cool data or cold data), 10% cool data (e.g., data that is written once and occasionally read such as less than 10 times during a defined period of time), and 40% cold data. As a user increasingly moves to using more application defined infrastructures, existing data may be constrained to be migrated off traditional point products to a customized, software defined infrastructure. However, one challenge in so doing is there may be a lack of existing knowledge of the classification of their data that needs to be migrated in terms of access pattern. Also, there may be a lack of knowledge about an ideal or optimal application defined reference architecture in terms of storage pool capacity, Input/Output operations per second ("IOPs"), and the like. With this lack of knowledge, migrating a user to application (e.g., software) defined infrastructure presents a major challenge such as, for example, customers as well as sales engineers attempting to migrate a user to application defined infrastructure.

In one aspect, the present invention provides for using a migration data placement tool between storage systems based on data access by a processor. Data may be indexed by a migration data placement tool by receiving events from a plurality of heterogeneous storage systems. The migration data placement tool may use analytics to determine data placement of the data in a target storage system according to the data identified as hot data, warm data, or cold data. The data may be placed according to a migration template during migration to the target storage system. Upon migrating data to the target storage system, one or more events may be received from the target storage system to enable an index to be updated with a new location of migrated data (e.g., migrated files).

Events from a plurality of heterogeneous storage systems may be indexed into a common repository. A migration data placement tool uses analytics to determine data placement of the data in a target storage system according to the data identified as hot data, warm data, or cold data based on the events indexed in the common repository. The data may be placed according to a migration template during migration to the target storage system.

The mechanisms of the illustrated embodiments may leverage an event driven index and search infrastructure called "meta ocean" across multiple source systems to determine data placement on a target system. In one aspect, the meta ocean may be the migration data placement tool or key-value store and/or may be a separate infrastructure in association with the migration data placement tool or key-value store. Data may be automatically migrated to a new system based on the derived file and/or object heat of the data. In addition, a user may model different migration scenarios or operations using the data access information contained in the meta ocean key-value store.

In an additional aspect, events may be indexed across a heterogeneous storage environment into a centralized key-value store (e.g., the meta ocean or migration data placement tool). A search across the centralized key-value store may be performed. The data may be analyzed to determine which data is hot data, warm data, cool data, and/or cold data across the multiple source systems, such as one or more web services providers. A data placement strategy may be derived to place the data from multiple systems into a correct storage tier (e.g., tiered according to the data being hot data, warm data, cool data, and/or cold data) across an application defined target infrastructure or storage medium. To derive the data placement strategy, a user may create one or more sample configurations with one or more different storage pool characteristics and assign source data to the appropriate storage pool in an iterative manner. When the user determines an optimal layout of the sample configurations, the configuration(s) may be saved and can be used as input to the actual migration process. The present invention also enables multi-tenant aware migration and file/object heat analytics.

In a heterogeneous storage system, data may be migrated to a customized software defined infrastructure by receiving events from multiple systems. The events may be indexed into a meta ocean (e.g., an event driven index and search infrastructure) using analytics to determine optimal data tiering (placement) based on hot data, warm data, and/or cold data. A custom data tiering configuration may be built and saved as a migration template. The data may be placed, in accordance with the migration template, during migration to a target storage system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
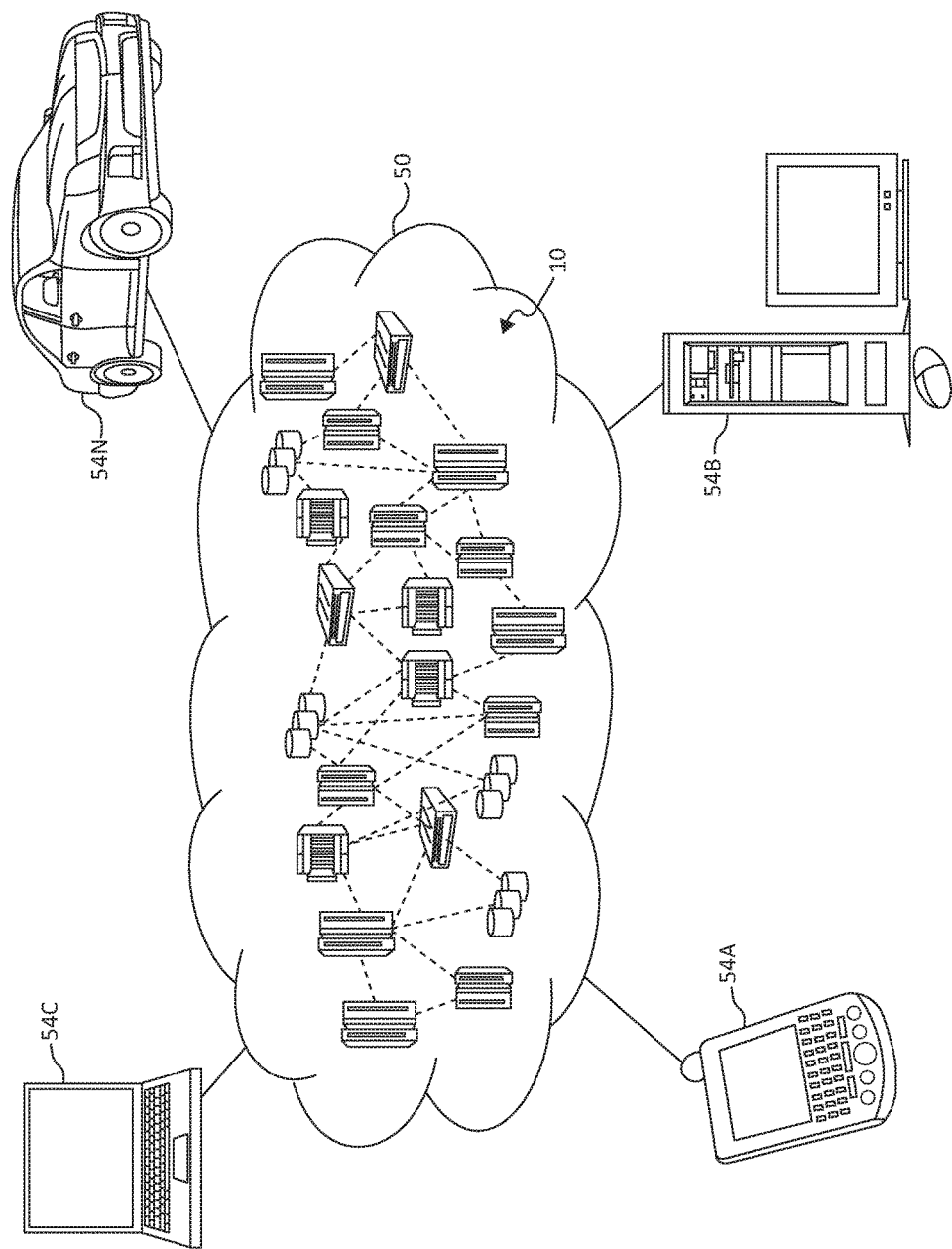
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
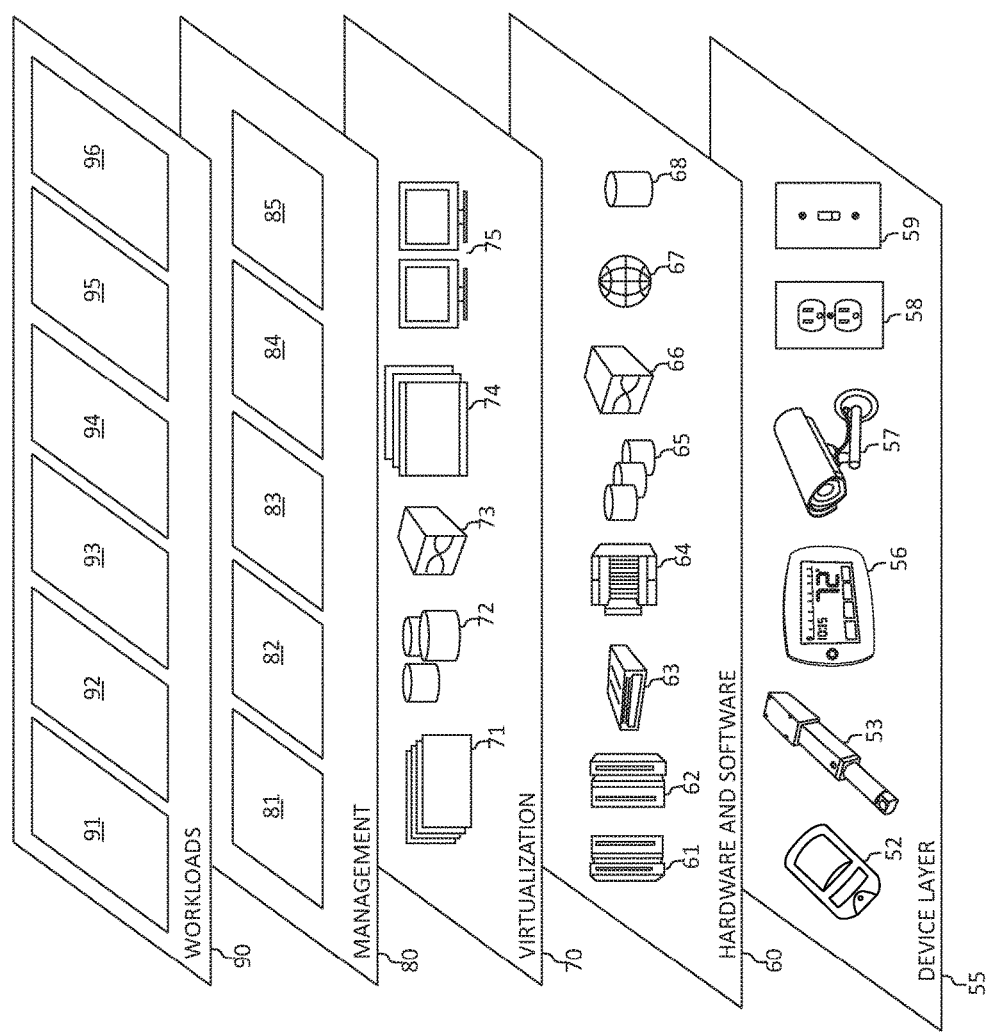
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various data migration modeling and placement workloads and functions 96. In addition, data migration modeling and placement workloads and functions 96 may include such operations as data analysis (including data collection and processing from various environmental sensors), data migration modeling, data migration recommendation, and data migration placement. One of ordinary skill in the art will appreciate that the data migration modeling and placement workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the data migration modeling and placement workloads. For example, the present invention may leverage a customized, application defined infrastructure tool that may be referred to herein as a meta ocean, as illustrated in FIG. 4.

Figure 4:
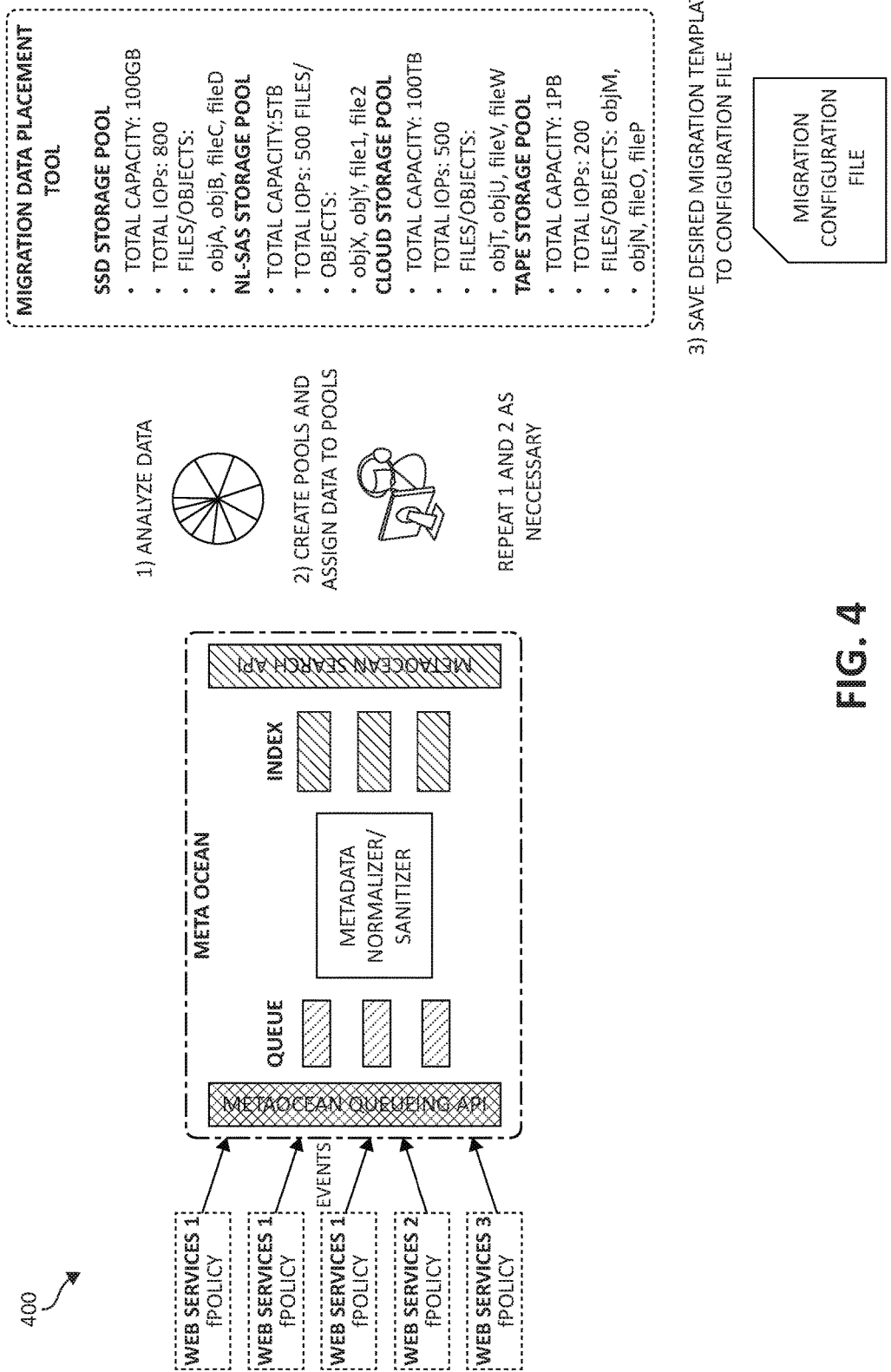
FIG. 4 is an additional block diagram depicting various user hardware and cloud computing components functioning using a centralized migration data placement tool in accordance with aspects of the present invention.

Turning now to FIG. 4, a block diagram 400 depicting various user hardware and cloud computing components functioning using a centralized event driven index and search infrastructure called "meta ocean" having a migration data placement tool is depicted. The event driven index and search infrastructure may include a queuing application programming interface ("API" or "meta ocean queuing API") for receiving one or more events from a plurality of heterogeneous storage systems such as, for example, one or more web service providers (e.g., web services 1 (or web service provider), web services 2, and/or web services 3 of FIG. 4). The event driven index and search infrastructure (e.g., a centralized migration data placement tool) may also include a search API (e.g., a "meta ocean search API"). For example, the plurality of heterogeneous storage systems (e.g., the one or more web services providers) may be Spectrum Scale LightWeightEvents provided by IBM®, Spectrum Archive Event Notification provided by IBM®, S3 Simple notification service provided by Amazon®, Cloud Object Storage Event Notification provided by IBM®, fPolicy provided by NetApp®, and or other web service providers.

The events may be placed in the queue of the event driven index and search infrastructure. The event driven index and search infrastructure may also include a metadata normalizer and/or sanitizer (e.g., data purging) and an index for indexing the events or contents of the events. For example, the event driven index and search infrastructure may capture metadata received from multiple heterogeneous sources such as, for example web services 1, web services 2, and/or web services 3, and indexes the content. One or more users may query the set of information in order to perform data analytics and select a course of action (e.g., data migration strategy) based on the mined data.

In one embodiment, the web services 1 may include one or more interfaces (e.g., fpolicy), for controlling access to files stored on and/or in the web service providers' devices or systems, to send events to event driven index and search infrastructure about activity on the web service provider, such as, web services 1. The events, received from multiple web service providers, may be sent to a same meta ocean instance. A single index and/or multiple indexes, containing the information across multiple web service providers, may be derived and used for indexing the data. The present invention provides a near real time index of content and access patterns of the web service provider sources. Events from web services 2 and web services 3, and other types of storage systems that can send events, may also be captured into meta ocean.

Consider some of the various aspects of the illustrated embodiments of FIG. 4. In one aspect, a user may 1) analyze data relating to data migrated to the event driven index and search infrastructure. Using the event driven index and search infrastructure, the user may 2) create storage pools (which may be included in a migration template) using a migration data placement tool, which may be internal or external to the event driven index and search infrastructure, each of which may have various storage pool characteristics, and assign and/or place the data therein during migration. By way of example only, the storage pools may include, for example, a solid state device (SSD) storage pool, a near-line ("NL") serial attached small computer system interface ("SCSI") ("NL-SAS") storage pool, a cloud storage pool, and/or a tape storage pool. 3) The migration template that is created may be saved to a migration configuration file. Steps 1 and 2 may be repeated as necessary.

Each storage pool may be a target storage pool and include various and/or different storage pool characteristics for storing data. For example, the SSD storage pool may have a total storage capacity of 100 gigabytes ("GB"), total IOPs of 800, and may store one or more types of files or objects, such as, for example, object A ("objA"), object B ("objB"), file C, and file D. The NL-SAS storage pool may have a total storage capacity of 5 terabytes ("TB"), total IOPs of 500, and may store one or more types of files or objects, such as, for example, object X ("objX"), object Y ("objY"), file 1, and file 2. The cloud storage pool may have a total storage capacity of 100 TBs, total IOPs of 500, and may store one or more types of files or objects, such as, for example, object T ("objT"), object U ("objU"), file V, and file W. The tape storage pool may have a total storage capacity of 1 petabytes ("PB"), total IOPs of 200, and may store one or more types of files or objects, such as, for example, object M ("objM"), object N ("objN"), file O, and file P. The analyzing of data, the creating of storage pools, and assigning of data to the storage pools may be iteratively repeated. Once a user is satisfied with the storage configuration, the event driven index and search infrastructure template (e.g., a migration template) may be saved as a data migration configuration file, which may be sent for storage to a targeted storage system.

With the foregoing functional components 400 in view, data analytics may be performed on the event data extracted from events from the source system that may be stored in the meta ocean. Storage pools may be created in the migration configuration template and assign objects and/or files to the respective pools. The total capacity required and IOPs required is designed to aid a user in adjusting and tuning the migration configuration. IOPs may be normalized and/or organized in the output of the migration configuration by taking a number of accesses of a same object and/or file over a specific time period. One or more queries may be issued against the data. The files and/or objects may be moved between one or more of the appropriate storage pools until the storage pools reach an optimal migration state (which may be according to user specifications, the temperature of the data, and/or characteristics of the storage pools) at which the storage pools can export a migration configuration file (having the storage pools with the tier data based on data access patterns) to be used during an actual data migration process.

Consider now the following example of pseudo code an analytics query issued (by a user) against the meta ocean content to determine an access frequency and size of data and to assign the data to storage pools:

access_type !=null (to filter out on demand indexing as compared to live events) aggregate=count
split slices, aggregation type=term=name (the name of the file)
order by count descending
split slices aggregation type=term=host (the host IP of the source data)
split slices aggregation type=term=owner (the owner of the object/file).

Figure 5:
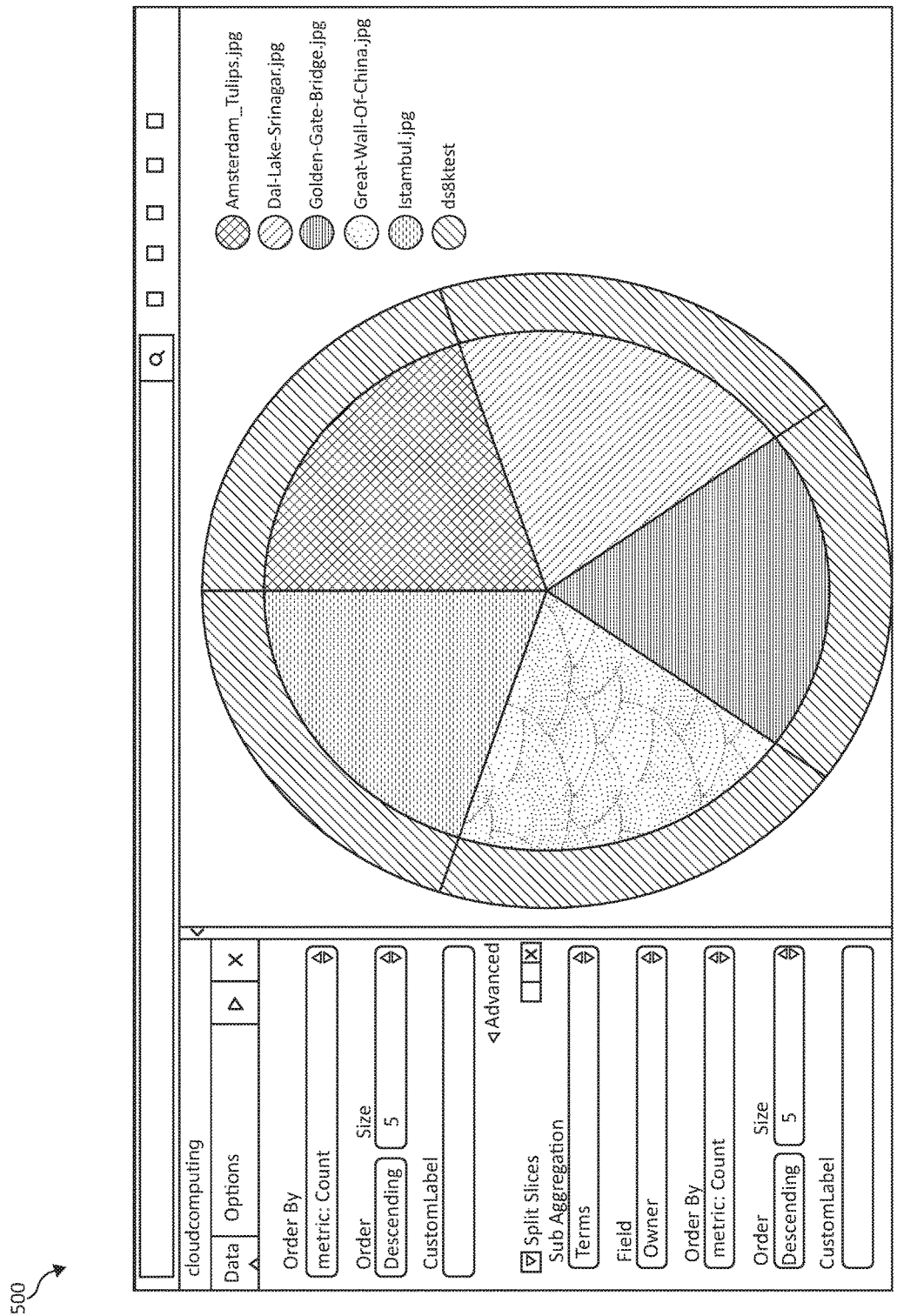
FIG. 5 is a diagram depicting an interactive graphical user interface (GUI) display of a centralized migration data placement tool in which aspects of the present invention may be realized.

FIG. 5 is a diagram depicting an interactive graphical user interface (GUI) display 500 of an event driven index and search infrastructure (e.g., a centralized migration data placement tool). As shown, the various functionality, or "modules" of functionality, hardware devices, and/or other components in the same descriptive sense as has been previously described in FIGS. 1-4 may be included in FIG. 5. In one aspect, an interactive graphical user interface (GUI) 500 of the centralized key-value store or "meta ocean" may be provided to enable a user to create the migration template. For example, a user may select specific portions of the output (displayed in the interactive GUI as a circular wheel or "pie graph") and drill down into the interactive display.

For example, the interactive GUI 500 illustrates the output of the migration configuration template as the "pie graph". In one aspect, a name, a size, and/or owner of the data of the migration configuration template may be provided when drilling down into the output displayed in the interactive GUI. Upon creating one or more target storage pools in the migration template, users may select in bulk objects/files to be placed in a specific pool or they may use filtering/ranges to move data. When moving the data to the target pool template, the capacity and IOPs for the storage pools are provided to the end user. One or more drop down tabs, such as "order by", "size", "sub aggregation", "order", "custom label", and/or other categorical alternatives may be provided for additional search and query.

Figure 6:
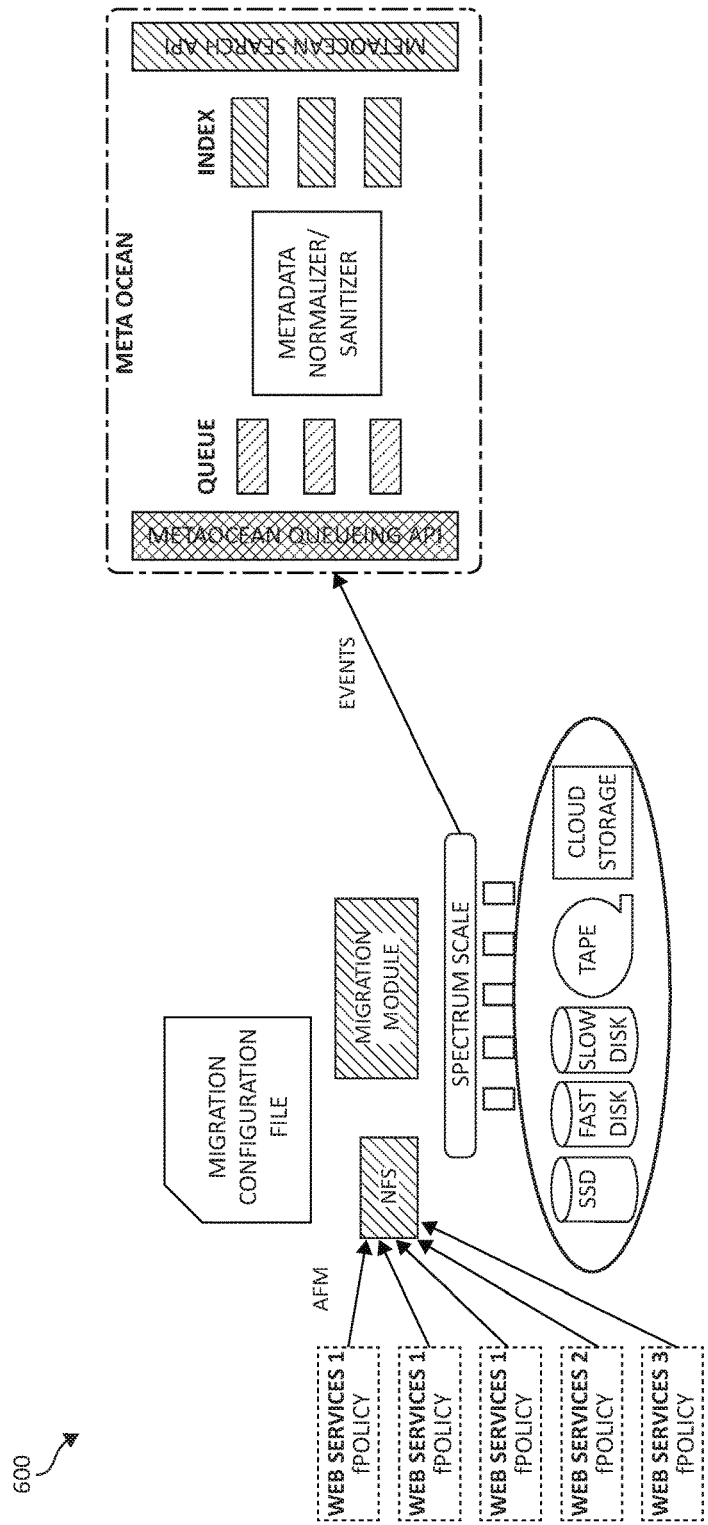
FIG. 6 is an additional block diagram depicting data migration based on a data migration configuration template using a centralized migration data placement tool in accordance with aspects of the present invention.

FIG. 6 is an additional block diagram 600 depicting data migration based on a data migration configuration template using a centralized migration data placement tool. As shown, the various functionality, or "modules" of functionality, hardware devices, and/or other components in the same descriptive sense as has been previously described in FIGS. 1-5 may be included in FIG. 6. The user can save the migration configuration file, which can be provided as input to a migration module (e.g., bulk migration). In the context of bulk migration, an active file management (AFM) system (or "Spectrum Scale" system or general parallel file system "GPFS") and a policy engine for facilitating data migration may be used. The AFM may enable a user to create associations from a local GPFS cluster to a remote cluster or storage (e.g., the various storage pools), and to define the location and flow of file data to automate the management of the data. That is, a scalable, high-performance file system caching layer of a cluster filing system may be used.

A migration template file, which may be included in a migration configuration file, may be used as input for information and directions indicating which of the files are to be migrated to specific ones of the storage pools, such as the SSD storage pool, a fast disk storage pool, a slow disk storage pool, a tape storage pool, and/or a cloud storage pool.

First, a target storage system may be checked to determine at least the available resources that may be required in the storage pools. If the target system does not have the available resources, an error may be reported. If the target system does have the available resources, the following steps, based on the migration configuration template and the actual target storage pool configuration, may be performed. 1) A file set may be created. 2) A file placement policy may be created for the file set. 3) The file set may be linked. 4) A network file system ("NFS") export operation may be created to export the file set. 5) An AFM relationship may be created. 6) The files specified in the migration configuration file may be migrated for a selected target storage pool. 7) The event may be sent to the meta ocean containing a new location of the file and/or object, which may be appended to an existing record in the meta ocean. The steps of 1-7 may be iteratively performed or repeated for each additional source system and target pool specified in the migration configuration file.

Figure 7:
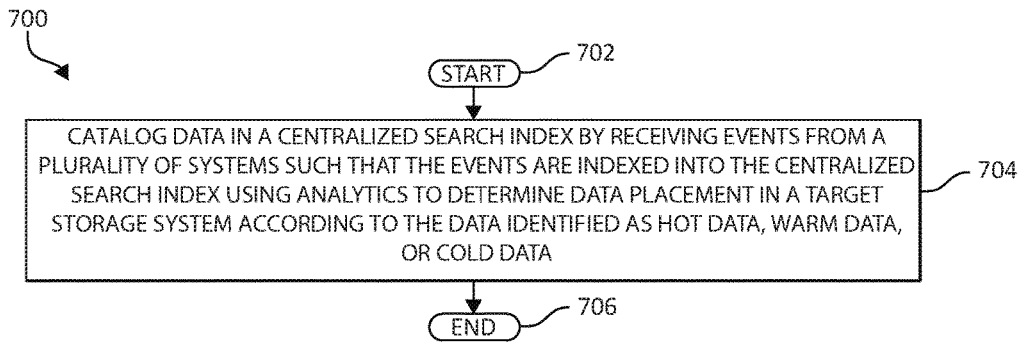
FIG. 7 is a flowchart diagram depicting an exemplary method for using a migration data placement tool for data migration modeling and recommendation between storage systems based on data access by a processor, in which aspects of the present invention may be realized.

Turning now to FIG. 7, a method 700 for using a migration data placement tool for data migration modeling and recommendation between storage systems based on data access is depicted, in which various aspects of the illustrated embodiments may be implemented. The functionality 700 may be implemented as a method executed as instructions on a machine, where the instructions are included on at least one computer readable medium or on a non-transitory machine-readable storage medium. The functionality 700 may start in block 702. Data may be catalogued to a centralized search index by receiving events from a plurality of systems such that the events are indexed into the centralized search index using analytics to determine data placement in a target storage system according to the data identified as hot data, warm data, or cold data, as in block 704. The functionality 700 may end in block 706.

Figure 8:
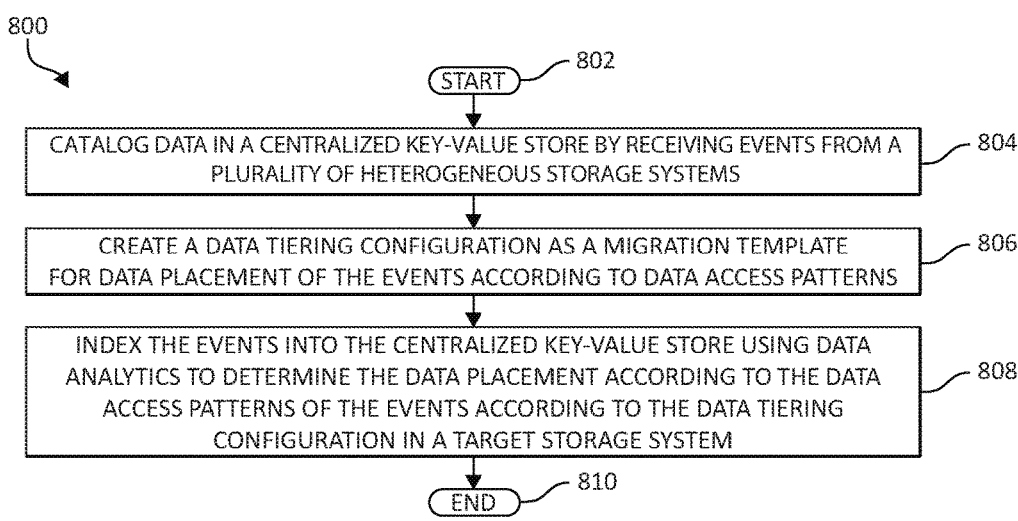
FIG. 8 is an additional flowchart diagram depicting an additional exemplary method for using a centralized key-value store between storage systems based on data access by a processor, again in which aspects of the present invention may be realized.

Turning now to FIG. 8, a method 800 for using a centralized key-value store between storage systems based on data access is depicted, in which various aspects of the illustrated embodiments may be implemented. The functionality 800 may be implemented as a method executed as instructions on a machine, where the instructions are included on at least one computer readable medium or on a non-transitory machine-readable storage medium. The functionality 800 may start in block 802. Data may be catalogued in a centralized key-value store by receiving events from a plurality of heterogeneous storage systems, as in block 804. A data tiering configuration may be created as a migration template for data placement according to data access patterns derived from the events, as in block 806. The events may be indexed into the centralized key-value store using data analytics to determine the data placement according to the data access patterns of the events according to the data tiering configuration in a target storage system, as in block 808. The functionality 800 may end in block 810. It should be noted that event data may be stored in one or more various types of repositories. The repository may be a key-value store such as, for example, the centralized key-value store, but may also be a database such as, for example, a DB2 databased provided by IBM® and/or a flat file or an extensible markup language (xml) file or any other way of storing information.

Figure 9:
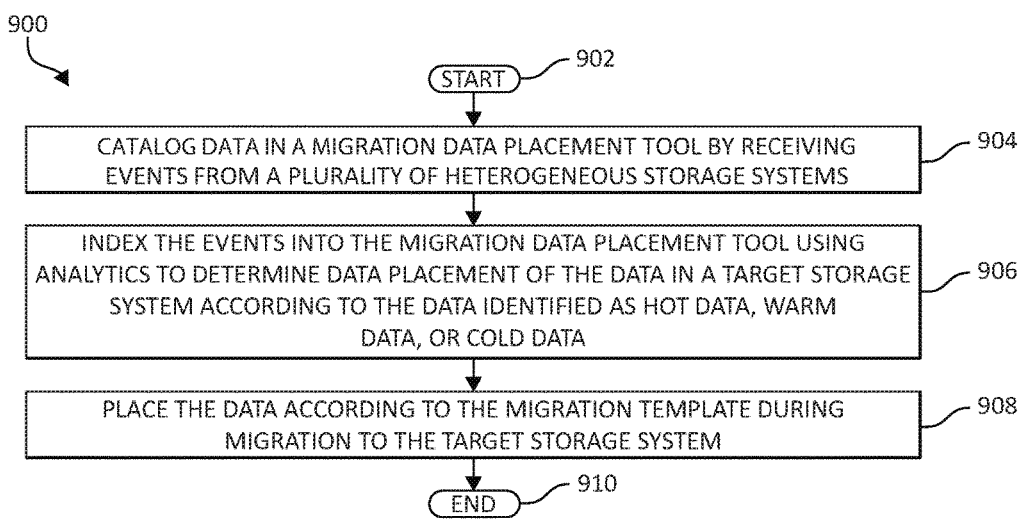
FIG. 9 is an additional flowchart diagram depicting an exemplary method for using a centralized migration data placement tool by a processor; again, in which aspects of the present invention may be realized.

Turning now to FIG. 9, a method 900 for using a centralized key-value store between storage systems based on data access is depicted, in which various aspects of the illustrated embodiments may be implemented. The functionality 900 may be implemented as a method executed as instructions on a machine, where the instructions are included on at least one computer readable medium or on a non-transitory machine-readable storage medium. The functionality 900 may start in block 902. Data may be catalogued in a migration data placement tool by receiving events from a plurality of heterogeneous storage systems, as in block 904. The events may be indexed into the migration data placement tool using analytics to determine data placement of the data in a target storage system according to the data identified as hot data, warm data, or cold data, as in block 906. The data may be placed according to the migration template during migration to the target storage system, as in block 908. The functionality 900 may end in block 910.

In one aspect, in conjunction with and/or as part of at least one block of FIGS. 7-9, the operations of 700, 800, and 900 may include each of the following. The operations of 700, 800, and 900 may build and save a custom data tiering configuration as a migration template for the data placement. The data may be placed according to the migration template during migration to the target storage system. One or more storage pools may be created in the migration template for placing the data during migration. A plurality of data migration scenarios and/or options may be modeled and/or recommended according to data access information provided by the centralized search index. Metadata may be captured and/or extracted from the plurality of systems and indexing content of the metadata.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for data migration and recommendation between storage systems based on data access, comprising:
   receiving events from a plurality of storage systems, each of the plurality of storage systems comprising a web service provider, such that the events are indexed into a centralized search index using analytics to determine data placement of data when migrated to a target storage system according to the data identified as hot data, warm data, or cold data; wherein the events include an indication of an access classification and a current location of the data;
   building and saving a custom data tiering configuration as a migration template for the data placement the migration template comprising a saved configuration file indicating directives as to where to migrate specific portions of the data on the target storage system; and
   placing the data according to the migration template during migration to the target storage system.

2. The method of claim 1, further including performing analysis on the data of one or more of the events extracted from the plurality of storage systems.

3. The method of claim 1, further including creating one or more storage pools in the migration template for placing the data during migration.

4. The method of claim 1, further including modeling a plurality of data migration options according to data access information provided by the centralized search index.

5. The method of claim 1, further including capturing metadata from the plurality of storage systems and indexing content of the metadata.

6. A method, by a processor, for using a centralized key-value store between storage systems based on data access, comprising:
 receiving events from a plurality of heterogeneous storage systems, each of the plurality of heterogeneous storage systems comprising a web service provider; wherein the events include an indication of an access classification and a current location of data;
 creating a data tiering configuration as a migration template for data placement of the data according to data access patterns, the migration template comprising a saved configuration file indicating directives as to where to migrate specific portions of the data on a target storage system;
 indexing the events into the centralized key-value store using data analytics to determine the data placement according to the data access patterns of the data according to the data tiering configuration in the target storage system; and
 iteratively placing the data in the target storage system according to the migration template during migration to the target storage system.

7. The method of claim 6, further including performing analysis on the data of one or more of the events extracted from the plurality of heterogeneous storage systems.

8. The method of claim 6, further including classifying the data as hot data, warm data, or cold data, wherein the hot data is data that is accessed more frequent as compared to the warm data and the cold data, the cold data is data that is less frequently accessed than both the warm data and the hot data, the warm data is data that is accessed less frequent than the hot data but more frequent than the cold data.

9. The method of claim 6, further including searching and analyzing the centralized key-value store to determine the data associated with the plurality of heterogeneous storage systems as hot data, warm data, or cold data for the data placement according to the data tiering configuration.

10. The method of claim 6, further including creating one or more storage pools having one or more storage pool characteristics in the migration template for placing the data during migration.

11. The method of claim 6, further including modeling a plurality of data migration options according to data access information provided by the centralized key-value store.

12. The method of claim 6, further including capturing metadata of the events from the plurality of systems and indexing content of the metadata in the centralized key-value store.

13. The method of claim 6, further including providing an interactive graphical user interface (GUI) of the centralized key-value store to enable a user to create the migration template.

14. A method, by a processor, for using a migration data placement tool between storage systems based on data access, comprising:
 receiving events from a plurality of heterogeneous storage systems, each of the plurality of heterogeneous storage systems comprising a web service provider; wherein the events include an indication of an access classification and a current location of data;
 indexing the events into the migration data placement tool using analytics to determine data placement of data in a target storage system according to the data identified as hot data, warm data, or cold data; and
 placing the data according to a migration template during migration to the target storage system, the migration template comprising a saved configuration file indicating directives as to where to migrate specific portions of the data on the target storage system.

15. The method of claim 14, further including creating a data tiering configuration as the migration template in the migration data placement tool for data placement of the data.

16. The method of claim 14, further including creating one or more storage pools in the migration data placement tool, having one or more storage pool characteristics, in the migration template for placing the data during migration.

17. The method of claim 14, further including providing an interactive graphical user interface (GUI) of a centralized key-value store to enable a user to create the migration template.

* * * * *